United States Patent
Gan et al.

(10) Patent No.: US 6,822,412 B1
(45) Date of Patent: Nov. 23, 2004

(54) METHOD FOR CALIBRATING AND PROGRAMMING OF A ROBOT APPLICATION

(76) Inventors: Zhongxue Gan, 97 Pierce Blvd., Windsor, CT (US) 06095; Gregory Rossano, 13 Riviera Dr., Enfield, CT (US) 06082; Xiongzi Li, 28 Brownleigh Rd., West Hartford, CT (US) 06117; Yunquan Sun, 17 Wildwood Rd., Storrs, CT (US) 06268; Quing Tang, 9 Candlewood La., Granby, CT (US) 06035; Torgny Brogårdh, Plåtverksgatan 140, SE-724 Västerås (SE); Håkan Brantmark, Snödroppavägen 41, SE-722 46 Västerås (SE)

( * ) Notice: Subject to any disclaimer, the term of this patent is extended or adjusted under 35 U.S.C. 154(b) by 0 days.

(21) Appl. No.: 10/458,810

(22) Filed: Jun. 11, 2003

(51) Int. Cl.[7] .................................................. B25J 9/04
(52) U.S. Cl. .............................. 318/568.19; 318/568.11; 318/568.13; 318/568.15; 901/3
(58) Field of Search ....................... 318/568.19, 568.11, 318/568.15; 901/3

(56) References Cited

U.S. PATENT DOCUMENTS 4,613,943 A * 9/1986 Miyake et al. .............. 700/251
4,920,500 A * 4/1990 Hetland et al. ............. 700/251
4,954,762 A * 9/1990 Miyake et al. ......... 318/568.19
4,979,121 A * 12/1990 Inoue et al. ................. 700/194
6,646,404 B2 * 11/2003 Okuyama et al. ...... 318/568.13

* cited by examiner

*Primary Examiner*—Rita Leykin
(74) *Attorney, Agent, or Firm*—Venable LLP; Eric J. Franklin (57) ABSTRACT

A method for programming of a robot application comprising an industrial robot having a robot coordinate system, a tool having a tool coordinate system and a work object (3) to be processed by the tool. The application is programmed by means of a position-measuring unit (15) adapted for measuring positions relative a measuring coordinate system (db). The programming method comprises: selecting an object reference structure (25) on the object, defining a mathematical model for the object reference structure, defining an object coordinate system (o2), providing measurements by the position-measuring unit on the surface of the object reference structure, determining the object coordinate system in relation to the measuring coordinate system (db) by best fit between said measurements and said mathematical model of the object reference structure.

22 Claims, 9 Drawing Sheets

METHOD FOR CALIBRATING AND PROGRAMMING OF A ROBOT APPLICATION

FIELD OF THE INVENTION

The present invention is directed to a method for programming of an industrial robot having a robot coordinate system and particularly to an application that is programmed by means of a position-measuring unit adapted for measuring positions relative a measuring coordinate system. The invention is useful for applications comprising a tool having a tool coordinate system and a work object to be processed by the tool. The invention is particularly useful in applications that demand high accuracy, such as different types of machining applications, for example fettling, debarring, milling, sawing, grinding and drilling. The application is also useful in applications such as arc welding, water jet cutting, laser cutting, gluing and assembly.

PRIOR ART

A robot program comprises a number of program instructions controlling the movements of the robot. Generation of a robot program comprises a first step wherein positions and orientations of a path, to be followed by the robot during execution of the program, are defined, and a next step wherein program instructions are generated based on the defined positions and orientations of the path. The positions and orientations defined during the programming comprise the positions and orientations that a tool is expected to obtain in relation to a work object when running the robot program.

A robot application is an application in which an industrial robot is used for performing a work. Robots are often used in applications involving processing of the surface of a work object. Existing practice for programming a robot involves on-line teaching the robot a sequence of positions and orientations. The positions and orientations define a robot path, which the robot shall follow during processing of the object. The robot is taught how to perform a task by being leading the tool through the various positions and orientations along the desired operating path during the programming. The robot program is then generated, based on the specified positions. However programming a robot by teaching can be time-consuming, especially if the work object has a complex geometry.

The accuracy of an application is limited mainly by the repeatability of the robot mechanics and the accuracy with which it is possible to move and rotate the tool to the desired position and orientation. In many high accuracy applications like machining, laser cutting, laser welding etc. the robot repeatability is good enough but it is very difficult for a human eye to find the correct position and orientation of the tool. Moreover, even if a robot programmer with long programming experience manages to obtain the accuracy needed, it will take a lot of time. The problem of long programming time makes it also very expensive to duplicate programs to other robots and to reprogram a robot cell after geometrical changes in the cell or after an exchange of the robot.

The utilization of high-level computer programming language and CAD/CAM has made off-line robot programming more feasible for more complex applications. In order to make off-line programming feasible it is necessary to know the cell geometry and the robot exactly. The work object coordinate system and the tool coordinate system have to be known with high accuracy relative to the robot base coordinate system. Thus, cell, object, tool and robot calibration have been the key issues to use robot off-line programming.

The accuracy of a general-purpose robot is between 5 and 15 mm, which can be improved to between 0.5 and 1 mm by the identification of the kinematic errors of the robot and compensation of these errors by software in the robot controller. However, this robot calibration technique is expensive and very difficult to support in a robot cell, and still the work object and tool coordinate systems must be calibrated. Moreover, this kinematic error compensation method will not be good enough for high accuracy applications.

OBJECTS AND SUMMARY OF THE INVENTION

The object of the present invention is to provide a method for fast and easy robot programming providing a high accuracy in a robot application.

This object is achieved by a method comprising: selecting an object reference structure on or in a fixed relation to the work object, the object reference structure having at least one surface, defining a mathematical model for the object reference structure, defining an object coordinate system in a fixed relation to the object reference structure, providing measurements on said at least one surface of the object reference structure, the measurements being performed by the position-measuring unit and are provided relative to the measuring coordinate system, determining the object coordinate system in relation to the measuring coordinate system, by means of best fit between said measurements performed by the position-measuring unit and said mathematical model of the object reference structure, measuring a plurality of positions on a desired robot path on the object by means of the position-measuring unit, determining the positions of the robot path in the object coordinate system, based on said measured positions of the robot path and said determined object coordinate system, determining the relation between the object coordinate system and the robot coordinate system, determining the relation between the tool coordinate system and the robot coordinate system, and programming the robot path based on said positions of the robot path in the object coordinate system, said relation between the object coordinate system and the robot coordinate system, and said relation between the tool coordinate system and the robot coordinate system. Programming the robot path means generating program instructions for moving the robot so that the tool obtains the positions and orientations in relation to the work object when running the robot program. The robot coordinate system could be any coordinate system defined in relation to the robot. Normally, a robot coordinate system attached to the base of the robot is used as a reference coordinate system for the robot. Thus, said base coordinate system is preferably used as the robot coordinate system.

The method according to the invention is a method for off-line programming of a robot by means of a position-measuring unit, for example a digitizer. The digitizer is used to specify the positions and orientations of the robot path on the work object in relation to an object coordinate system. Off-line programming of a robot is both faster and easier than on-line programming. A problem with off-line programming by a digitizer is that there may be deviations between the tool positions and orientations taught with the digitizer and run with the robot.

To overcome this problem the programming method according to the invention comprises a calibration step utilizing the position-measuring unit for performing measurements on an object reference structure having an object coordinate system defined in a fixed relation to it. If the work object contains well defined surfaces, the reference structure could be selected on the work object, otherwise a reference structure having well defined surfaces is mounted on the work object.

The method according to the invention combines the advantages of off-line programming with the accuracy of lead through programming. Moreover it solves the problems with the limited human accuracy with respect to tool manipulation and makes the programming totally safe since the robot does not need to work during programming and calibration. To make this possible, the position-measuring unit is used both for programming and calibration in such a way that the robot accuracy will not depend on the total kinematic and geometrical errors of the cell, but on just the differential kinematic and geometrical errors. In principle, position differences are used instead of absolute positions for the calibration and programming.

According to an embodiment of the invention said object reference structure is three-dimensional and has at least three non-parallel surfaces, and measurements are provided on said at least three surfaces of the object reference structure. With a three-dimensional reference structure it is possible to calibrate the programmed path poses (positions and orientations that the tool is expected to obtain when running the robot program) to the object coordinate system using the digitizer and then use the programmed path poses expressed in the object coordinate system for programming the robot.

According to an embodiment of the invention said object reference structure is any of a plate, a cube, a cone or a cylinder. Such structures are easy to manufacture and to measure on.

According to an embodiment of the invention said selected object reference structure is positioned in the vicinity of said robot path. Thus, the calibration is improved and a higher accuracy of the programming is achieved.

According to an embodiment of the invention the relation between the object coordinate system and the robot coordinate system comprises performing measurements on at least one surface of the object reference structure, or of a reference structure on or in a fixed relation to the object, wherein the measurements are performed by means of an elongated probe and the inclination of the probe relative to the surface during the measurements is essentially the same as the inclination of the tool in relation to the object in the robot path. If a programmed pose has another tool orientation, than was used during the calibration of the coordinate system, then errors in the robot kinematics may give both position and orientation errors. By having an inclination of the probe during the calibration, which is about the same as the inclination of the tool during the processing of the object, the accuracy of the calibration is improved and thus a higher accuracy of the programming is achieved.

According to an embodiment of the invention the determining of the relation between the object coordinate system and the robot coordinate system comprises: performing measurements on said surface of the object reference structure, the measurements being performed by the robot and are provided relative to the robot coordinate system, and determining the object coordinate system in relation to the robot coordinate system, by means of best fit between said measurements performed by the robot and said mathematical model of the object reference structure. In this embodiment the relation between the object coordinate system and the robot coordinate system is determined by performing measurements with the robot on the same object reference structure, as the measurements with the position-measuring unit. Thus, the calibration can easily be automatically made. No other reference structures or probes, which have to be calibrated, are needed.

Preferably, a robot program, for performing said measurements on the object reference structure by the robot, is automatically generated based on said measurements on the object reference structure performed by the position-measuring unit. Thereby, the calibration can be made easy and quickly.

According to an embodiment of the invention the direction of the normal of said surface of the object reference structure is calculated, based on said measurements on the object reference structure performed by the position-measuring unit, and the robot is moved from said calculated direction towards the surface when performing said measurements. Thus, the robot will know the correct direction to move towards the surface of the object.

According to another embodiment of the invention the determining of the relation between the object coordinate system and the robot coordinate system comprises: selecting a robot reference structure on or in a fixed relation to the robot, the robot reference structure having at least one surface, defining a mathematical model for the robot reference structure, defining a second robot coordinate system in a fixed relation to the robot reference structure, performing measurements on said at least one surface of the robot reference structure, the measurements being made by the robot or the measuring unit, determining the object coordinate system in relation to said first mentioned robot coordinate system, by means of best fit between said measurements of the robot reference structure and said mathematical model of the robot reference structure. Preferably, said measurements performed on said at least one surface of the robot reference structure, are being made by the robot or the positioning measuring unit.

In this embodiment a robot reference structure is defined in addition to the object reference structure. Preferably said robot reference structure is selected on or in a close vicinity of the tool holder of the robot to make it easier to define a reference coordinate system in relation to a tool holder coordinate system. Either the robot reference structure is measured by moving the robot reference structure in contact with a fixed positioned measuring probe, having a known position relative to the robot coordinate system, and reading the robot position at the contact, or by moving the position-measuring unit in contact with the robot reference structure. An advantage with using the positioning-measuring unit is that the accuracy of the measurement will be higher than if the robot makes the measurements. An advantage with using the robot is that the measuring can be automatically made.

According to an embodiment of the invention the method comprises: providing a measuring probe in a fixed known position relative to the robot, performing measurements on the surface of the robot reference structure, the measurements being made by said measuring probe, performing measurements on the surface of the object reference structure, the measurements being made by said measuring probe, determining the relation between the object coordinate system and the second robot coordinate system, based on said measurements of the robot reference structure and said measurements of the object reference structure made by said measuring probe. When a heavy object is on the robot it is difficult to put the work object also on the digitizer. According to this embodiment a fixed mounted probe is used for the measurements. Thus, this method is preferably used when the work object is mounted on the robot and the tool is fixedly mounted in the workcell.

According to an embodiment of the invention said measurements on said surface of the robot reference structure are made by the position-measuring unit and relative to the measuring coordinate system, and said relation between the object coordinate system and the robot coordinate system is determined, based on said object coordinate system relative to the measuring coordinate system. Thus, this method is preferably used when the tool is mounted on the robot, and the work object is fixedly mounted in the workcell. Preferably said robot reference structure is positioned on or in a close vicinity of the outer end of the tool to make the influence of the kinematic errors of the robot as small as possible.

According to an embodiment of the invention the method further comprises: selecting a second object reference structure on or in a fixed relation to the object, the second object reference structure having at least one surface, defining a second object coordinate system on or in a fixed relation to the object reference structure, providing measurements on said at least one surface of the second object reference structure, the measurements being performed by the position-measuring unit and are provided relative to the measuring coordinate system, and determining the second object coordinate system in relation to the measuring coordinate system, by means of best fit between said measurements on the second object reference structure and said mathematical model of the object reference structure, determining the relation between the second object coordinate system and the robot coordinate system, the robot path poses are determined and programmed based on either the first or the second coordinate system according to a chosen condition. It sometimes happens that the robot accuracy is not good enough to catch the whole work object. According to this embodiment more than one object coordinate system is defined to compensate for robot inaccuracy locally on the object. It is also possible to use different object coordinate systems for different tool orientations, to take care of the kinematic errors at different tool orientation.

Which of the different object coordinate systems to be used, when a program defined by the position-measuring unit is run, could be chosen in dependence of which of the first or second coordinate system is closest to the robot path position, which of the first and second coordinate systems has the tool orientation during calibration closest to the tool orientation in the path poses, or which of the first and second coordinate systems has the same torque direction on the robot axes during the calibration as for the path poses.

According to an embodiment of the invention the determining of the relation between the tool coordinate system and the robot coordinate system comprises: defining an reference coordinate system on or in a fixed relation to the tool base, the relation between reference tool coordinate system and the robot coordinate system being known, selecting a first tool reference structure on or in a fixed relation to the reference coordinate system, the first tool reference structure having at least one surface, defining a mathematical model for the first tool reference structure, selecting a second tool reference structure in a fixed relation to the tool coordinate system, and at a distance from the first tool reference structure, the second tool reference structure having at least one surface, defining a mathematical model for the second tool reference structure, providing measurements on said at least one surface of the first tool reference structure, providing measurements on said at least one surface of the second tool reference structure, determining the relation between the tool coordinate system and the reference coordinate system, by means of best fit between said measurements on the first and the second tool reference structures, and said mathematical models of the object reference structures. The tool coordinate system is determined relative to the robot coordinate system by means of two tool reference structures located on or in a fixed relation to each other and at a distance from each other. The reference structures are measured either with the position-measuring unit or the robot and a fixed positioned probe with a known position relative to the robot.

Another object of the invention is to provide a computer program product for fast and easy robot programming of an industrial robot, which provides high accuracy in the robot application. This object is achieved by a computer program product according to the corresponding appending claim, which when run on a computer execute the method according to the invention. The computer program product can be provided via any computer readable medium or via a network, such as the Internet.

It is easy to realize that the method according to the invention, as defined in the appending set of method claims, is suitable for being executed by a computer program having instructions corresponding to the steps in the inventive method when run on a processor unit. Even though not explicitly expressed in the claims, the invention covers a computer program product in combination with the method according to the appended method claims.

Another object of the invention is to provide a computer readable medium having a program recorded thereon for programming an industrial robot, where the program is to make a computer perform the steps of the aforementioned computer program product, when said program is run on the computer.

The computer program product may be run on a controller of the robot or on any other external computer comprising a processor and suitable memory.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

The robot application selected to describe the method according to the invention is machining, but the method can as well be used for any type of application, where high accuracy is needed.

Figure 1:
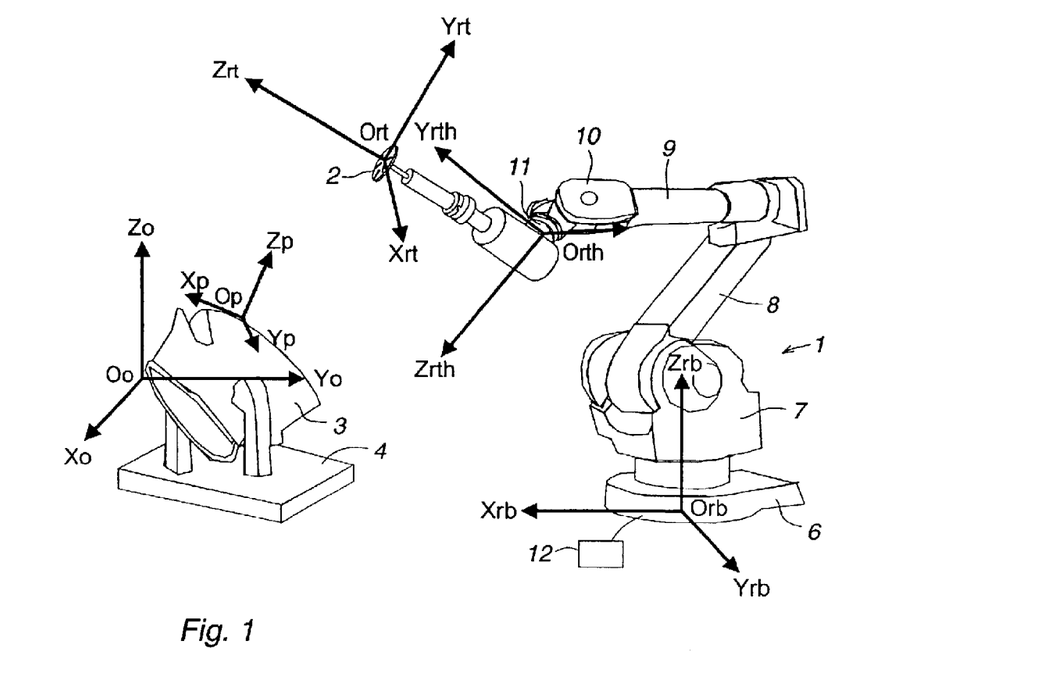
FIG. 1 shows an industrial robot application and the coordinate systems defined in the application.

FIG. 1 shows a robot application comprising an industrial robot 1, a tool 2 mounted on the robot, and a work object 3 to be processed by the tool. The work object 3 is attached to a fixture 4. The robot 1 comprises a base 6, which is firmly mounted on a foundation. The robot further comprises a support 7, which is rotateable relative to the base 6 around a first vertical axis. In the upper end of the support 7, a first robot arm 8 is rotatably mounted around a second horizontal axis. In the outer end of the first arm, a second arm 9 is rotatably mounted relative to the first arm around a third axis. The second robot arm 9 is rotatably mounted relative to an inner part of the arm around a fourth axis, coinciding with the length axis of the second arm 9. The second arm 9 supports in its outer end a so-called robot hand 10, which is rotateable around a fifth axis, which is perpendicular to the length axis of the second arm 9. The robot also comprises a tool holder 11, also denoted the tool mechanical interface. The outer part of the robot hand and thus the tool holder 11 is rotateable relative to the inner part of the robot hand around a sixth axis.

The robot further comprises a controller 12 for controlling the movements of the robot. The controller comprises at least one processor for executing the robot program instructions and memory for storing the robot program.

Of central importance for the method according to the invention are the different coordinate systems that are used in the calibration of the robot application. The placement of the robot itself is usually described by a robot base coordinate system with origin Orb, and axes Xrb, Yrb, and Zrb. The robot base coordinate system is located in the base 6 of the robot. Further, a robot tool holder coordinate system is defined, Orth, Xrth, Yrth, Zrth. The robot tool holder coordinate system is also denoted the tool mechanical interface coordinate system. The robot tool holder coordinate system is calculated in relation to the robot base coordinate system by means of a robot kinematic model. A robot tool coordinate system Ort, Xrt, Zrt, Yrt is defined in the tool center point (TCP) of the tool 2. The robot tool coordinate system is then defined in the robot tool holder coordinate system. Any position in the robot tool coordinate system can thus be expressed also in the robot tool holder coordinate system and in the robot base coordinate system. For this well-known coordinate system transformations are used.

An object coordinate system, with origin Oo and axes Xo, Yo, Zo is defined on the object. For each programmed point on the work object a path coordinate system, with origin Op and axes Xp, Yp, Zp, is defined in relation to the object coordinate system. The path coordinate system defines the program pose, i.e. position and orientation that the tool coordinate system must obtain during program execution. In the same way as described in the previous paragraph, the path coordinate system is defined in relation to the object coordinate system with one transformation and to the robot base coordinate system with another transformation.

Figure 2:
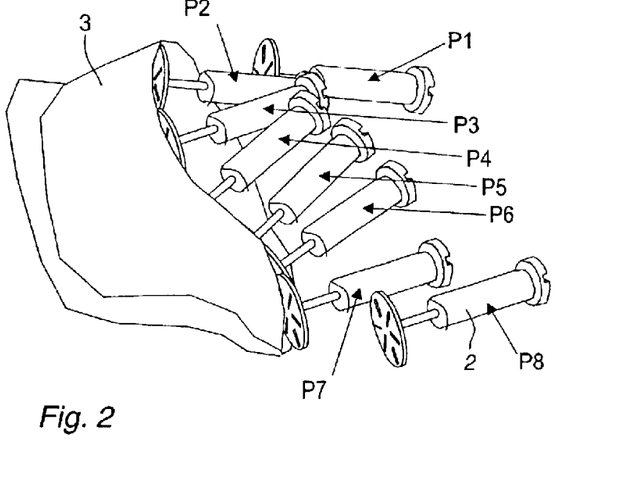
FIG. 2 shows robot tool poses in a milling operation.

FIG. 2 shows a typical program for a milling operation, exemplified by eight program poses, poses 1–8, defining a path that the robot tool must follow during the milling operation. The aim of the method according to the invention is to make it possible to program such a path in a short time without any safety problems and with accuracy limited only by the repeatability of the robot.

The method according to the invention is based on the use of a position-measuring device for programming the path. The measuring device should make measurements with 3–6 degrees of freedom, preferably 6 degrees of freedom, since it will then be possible to measure the orientation of a programmed pose with only one measurement. A so-called digitizer exemplifies the position-measuring device. The digitizer can be mechanical or optical and if lower accuracy can be accepted also 3D measurement systems based on ultrasonics, magnetic fields and microwaves (GPS) can be used.

Figure 3:
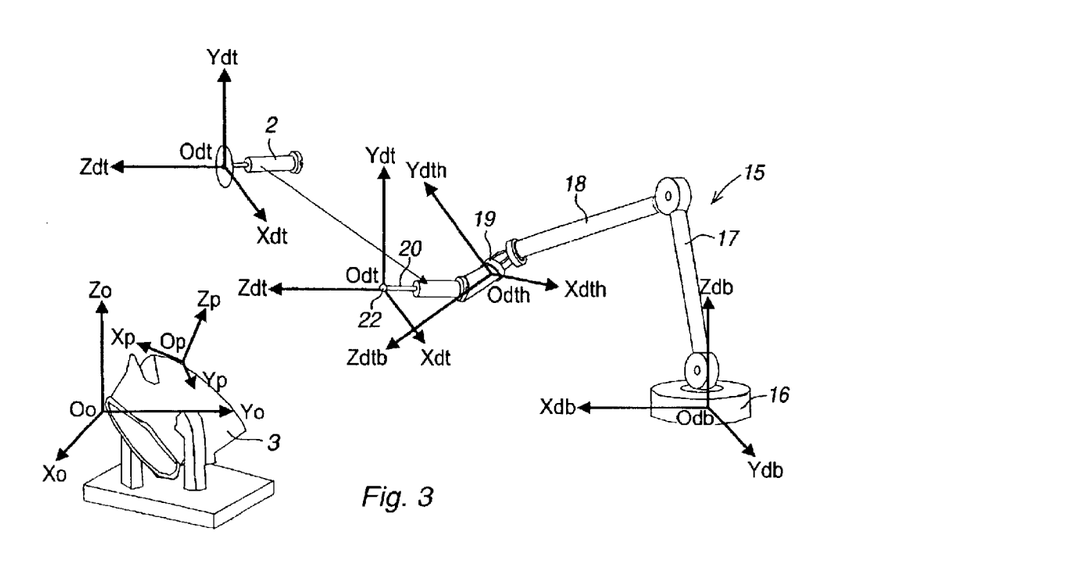
FIG. 3 shows a position-measuring unit and its coordinate system in relation to its tool coordinate system and the work object coordinate systems.

FIG. 3 shows a mechanical digitizer arm system 15 comprising a base 16 and couple of arms 17, 18, and a tool holder 19. The digitizer holds a probe 20, and the tip of the probe 20 is a measurement sphere 22 that will measure only position. Alternatively, instead of holding the probe as shown in the figure, the digitizer could hold the real tool during the programming and calibration. If a tool or a probe with a flat surface, for example a plane, is used also the orientation can be measured simultaneously with the position. The coordinate systems defined for the digitizer is: a digitizer base coordinate system, with origin Odb and axes Xdb, Ydb, Zdb, a digitizer tool holder coordinate system, with origin Odth and axes Xdth, Ydth, Zdth, and a digitizer tool coordinate system with origin Odt and axes Xdt, Ydt, Zdt.

Figure 4A:
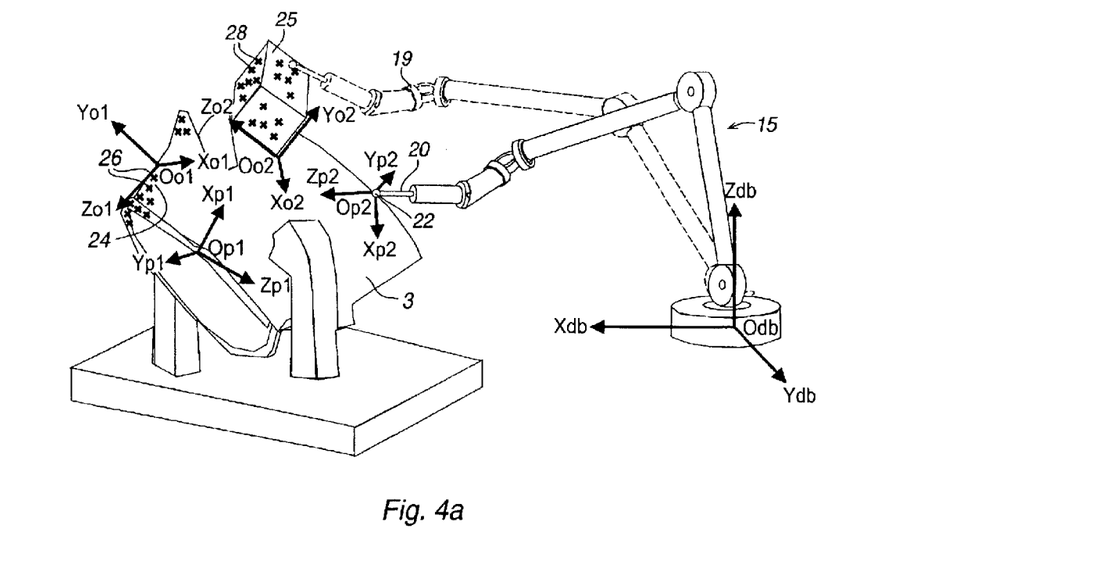
FIG. 4a shows determining an object coordinate system in relation to a digitizer base coordinate system, according to an embodiment of the invention.
Figure 4B:
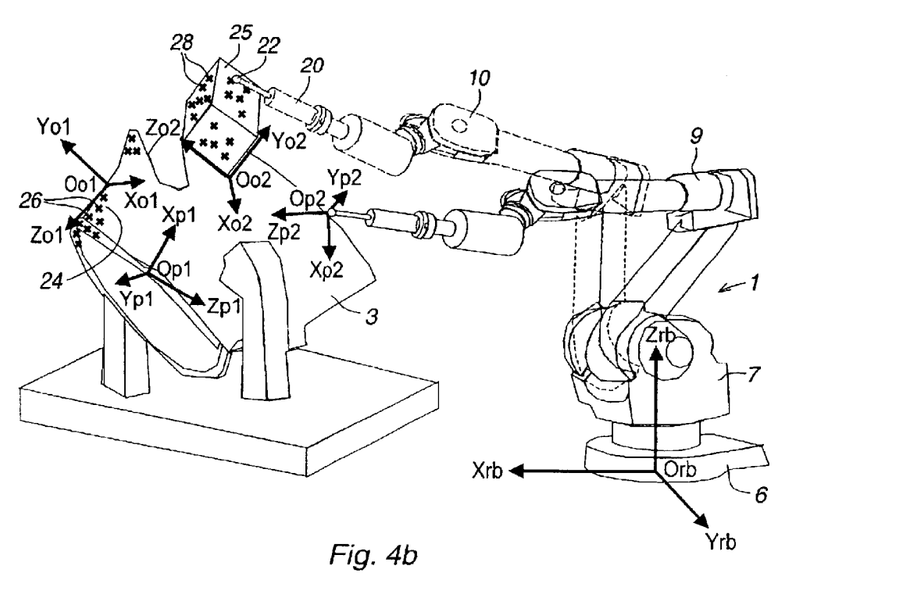
FIG. 4b shows determining the relation between the object coordinate system and the robot base coordinate system, according to an embodiment of the invention.

FIGS. 4a and 4b shows how the programming and the associated work object calibration can be made according to an embodiment of the method according to the invention. During calibration and programming a probe 20 with a known geometry is mounted on the digitizer 15. Alternatively, it is possible to use a tool, with known or calibrated geometry, for the programming and calibration. The coordinate system of the tool is then positioned and orientated relative to the poses programmed by the digitizer. It is advantageous if the digitizer is provided with the same probe or tool during the calibration and the programming.

To make the differential kinematic programming possible, one or more geometrically known reference structures are selected on or in a fixed relation to the work object. Preferably the reference structure is positioned as close as possible to the path to be programmed. If the work object itself has defined geometries, one or more of these geometries can be used to define one or more object coordinate systems. In FIG. 4a, a first object reference structure 24 is selected on the work object 3 and a first object coordinate system Oo1, Xo1, Yo1, Zo1 is defined in fixed relation to the first reference structure 24. In this example two different paths are to be programmed. In FIGS. 4a and 4b two poses p1, p2 on the different paths are shown. Each pose on the paths could be described a path coordinate system as Op1, Xp1, Yp1, Zp1 and Op2, Xp2, Yp2, Zp2. The objective with a path coordinate system is to define the position and orientation of the tool coordinate system when the robot program is executed. Since the first object reference structure is close to p1, this reference structure is suitable for calibration of the first path p1.

For calibration of the second path p2, a geometrically known second object reference structure 25, in this embodiment a cube, is mounted on the work object, preferably as close as possible to the path p2. The absolute pose of the reference structure in relation to the object does not need to be known; the only requirement is that its pose must be kept the same until both the digitizer and the robot have made its measurements on the reference structure. A second object coordinate system, with origin Oo2 and axes Xo2, Yo2, Zo2 is defined in a fixed relation to the second object reference structure 25. The second object coordinate system could simply be defined by three edges of the cube. Mathematical models of the object reference structures are defined. The mathematical model could be given by a CAD model of the object, either in an analytic form or in an approximate form by, for example, polygon or spline functions. In the case of the cube, the mathematical model is the equations of the planes of the cube.

FIG. 4a shows determining the first and second object coordinate systems o1, o2 in relation to the digitizer base coordinate system db. To define the first object coordinate system o1, the digitizer is used to measure points 26 directly on the work object and best fit is then made between the measurement points and the geometrical model of the first reference structure. Thus, the first object coordinate system o1 is determined in relation to the digitizer base coordinate system db.

Now calibration and programming of the second path p2 will be described more closely. Since the second reference structure 25 is mounted close to the second path p2, the second reference structure 25 is selected for calibration of the second path p2. In FIG. 4a, it is shown how the digitizer 15 measures a number of points 28 on surfaces of the cube 25. The measurements of the position of the probe tip are made when the probe hits different surfaces on the reference structure. At least in total six measurement points on at least three non-parallel surfaces are preferably measured. On the first surface at least three measurements are made, on the second surface at least two measurements are made and on the third surface at least one measurement is made. The position of the points 28 are measured relative to the base coordinate system of the digitizer db.

The second object coordinate system o2 is calculated relative to the digitizer base coordinate system db, by doing a best fit between the measured points 28 and the mathematical model of the cube. The best fit between the measurement points and the geometrical model of the reference structure is, for example, made by minimizing the distance between the measurement points and a surface of the model by means of a least mean square method, through translation and rotation of the geometric model. Alternatively, other optimization algorithms, for example, Gauss Newton, could replace the least mean square method.

The digitizer 15 is also used to define the program poses, simply by holding the tip 22 of the probe 20 on the path positions on the work object 3. The digitizer probe 20 is targeting the pose p2 of the second path. Since the digitizer now has measured the path poses p2 relative to the digitizer base coordinate system db, and the object coordinate system o2 is known in the digitizer base coordinate system db, it is possible to calculate the path poses p2 in the object coordinate system.

The paths are measured with high accuracy in relation to their closest object coordinate system. With close coordinate system is meant that the axes of the robot only need small changes in their angles to go from the measurement positions on the reference structure to the path positions. This means that too big changes both in position and orientation of the probe or tool should be avoided. Moreover, it is known that because of lost motion in gearboxes, the robot will lose accuracy when the torque in an axis changes sign. Therefore, one should also try to select the reference structure pose in such a way that the torque directions on the axis of the robot, and then especially the main axes, are the same when the robot reaches the positions on the close reference structure and the poses on the path. A pose is defined by its position and orientation, for example as $(x,y,z,\alpha,\beta,\chi)$ where x,y,z are Cartesian coordinates and $\alpha,\beta,\chi$ are the Euler angles.

If the work object contains well-defined surfaces on structures as planes, cylinders, or spheres, it is possible to select a structure on the work object as the object reference structure. If the work object does not contain any suitable surfaces, a reference structure is mounted on the work object. The reference structure should contain the planes needed for the calibration. If, for example, only a plane will be cut or milled, then it is enough with a plate mounted on the work object to be cut or milled. In some applications the shape of the reference structure selected should depend on the shape of the object to be processed or the shape of the tool used. For example, if a cylindrical hole is to be machined, a cylindrical reference structure is preferably used. If the tool is rotational symmetric it is advantageous to select a reference structure which is also rotational symmetric, such as a cone, a solid or a hollow cylinder.

Figure 5:
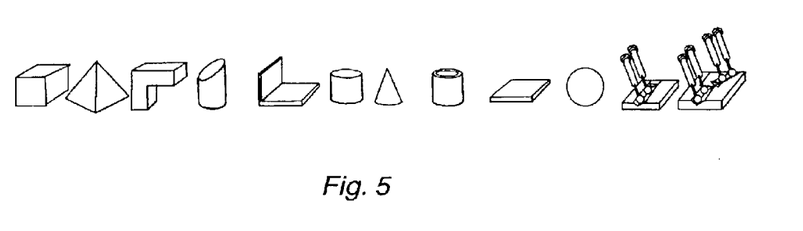
FIG. 5 shows examples of reference structures.

FIG. 5 shows a number of possible reference structures. The reference structure is, for example, a plane defining two degrees of freedom, a sphere defining three degrees of freedom, a plane comprising one or more grooves, a hollow cylinder defining four degrees of freedom, a cone, a solid cylinder, two perpendicular planes defining five degrees of freedom, a truncated cone, an L-shaped structure, a pyramid, or a cube defining six degrees of freedom.

For programming, for example machining applications, it is advantageous to use a work object which has already been machined to the desired geometrical dimensions, for example by manually machining or by a machine tool. Otherwise, the surfaces could be to rough for the calibration and programming. It is also possible to use a model of the work object for calibration and programming purpose, for example in wood or plastics.

FIG. 4b shows how the relation between the object coordinate systems o1, o2 and the robot base coordinate system rb, is determined by means of the robot itself. Since the digitizer has already defined the probe poses in relation to the object coordinate system, a robot program can automatically be generated to make the robot move to the positions on the reference structure defined during the off-line programming shown in FIG. 4a. This program relies on the absolute accuracy of the robot kinematics and a common rough work object calibration may be needed at first, for example, by teaching the robot to at least four points on three edges of the reference structure 25.

A probe or a calibration tool with known geometry is mounted on the robot. The same probe or tool could be used as was used during the calibration and off-line programming with the digitizer. Now, using the robot kinematics for the measurements and best fit between the model of the reference structure and the measured positions on the reference structure surfaces, the object coordinate system o1, o2 can be expressed in the robot base coordinate system rb. The path poses are known with high accuracy in the object coordinate system from the digitizer measurements, and thus the robot just needs to be accurate in the kinematic calculations of the path poses in relation to the closest object coordinate system. Thus, the path poses p1, p2 determined in relation to the object coordinate systems o1, o2 are used for moving the robot to the path poses p1, p2 during processing of the object.

When the positions of the surfaces of the object reference structure are generated to the robot program from the digitizer measurements, to avoid lead-through programming of the calibration positions on the reference structure, the robot absolute kinematic errors will give large errors in the robot positioning. Therefore, a probe with a moveable measurement tip could be used combined with built-in sensors, for example for 3D measurements. As an alternative, the robot could use a rigid probe, but run search motions with soft servo, force control, or impedance control. The probe on the digitizer should, of course, be rigid, since it is manually operated.

In production, the robot will not use a probe as a tool. If the tool geometry and the probe geometries are known in advance, for example, from CMM measurements, then the robot tool coordinate system rt is known in relation to the tool holder coordinate system rth both for the probe and for the tools that will be used. However, if the tool geometry is not known with the accuracy needed for the application, the tool must be calibrated and for this, methods relying only on the differential kinematics of the robot must be used. If the tool to be used is not too big, the robot itself can be used for the tool calibration as described in FIGS. 6a, 6b, 7a, and 7b.

Figure 6A:
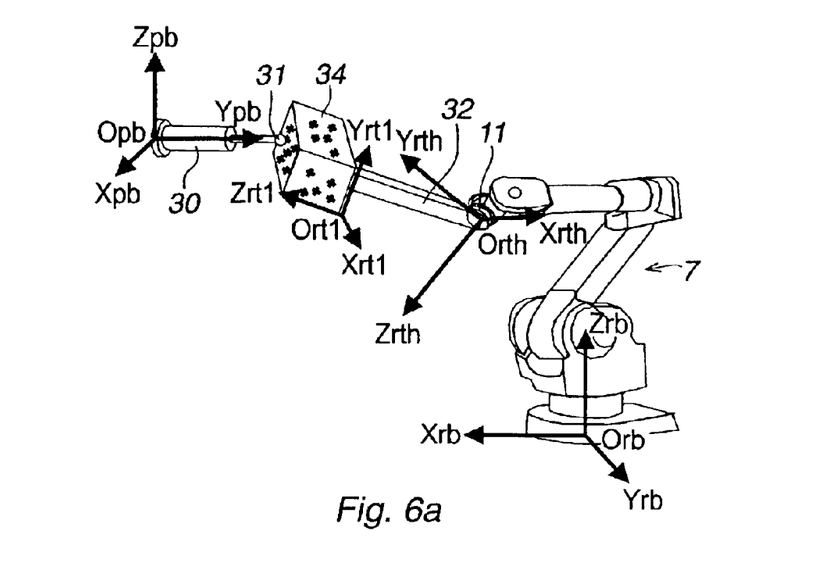
FIGS. 6a–b show determining the relation between the tool coordinate system and the robot base coordinate system, according to a first embodiment of the invention.
Figure 6B:
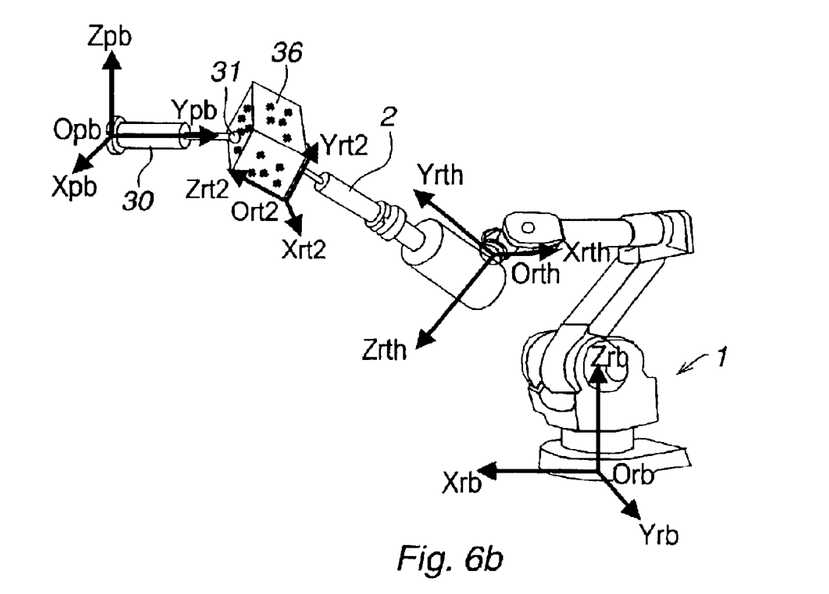

FIGS. 6a and 6b show how the relation between the robot tool coordinate system rt2 and the robot base coordinate system rb is determined by means of a fixed positioned measuring probe 30. The measuring probe 30 is fixedly mounted in relation to the robot 1 and has a tip 31. A probe base coordinate system Opb, Xpb, Zpb, Ypb is defined in a fixed relation to the probe 30. The measuring probe may be a contact sensor, such as a trigger probe, or any other type of position and/or orientation measurement sensor could be used. Before the tool can be calibrated the position of the probe tip 31 must be determined in relation to the robot base coordinate system. The robot tool holder coordinate system rth is known in relation to the robot base coordinate system rb by means of the robot kinematics.

FIG. 6a shows how the position of the probe tip 31 is determined in relation to the robot base coordinate system by means of a reference tool 32 with known geometry. The reference tool 32 comprises a tool reference structure 34. The reference tool 32 is mounted on the robot tool holder 11. A reference tool coordinate system Ort1, Xrt1, Yrt1, Zrt1 is defined for the tool reference structure 34. The robot moves the reference structure 34 against the tip 31 of the probe 30. The positions and orientations of the reference tool coordinate system rt1 is measured with the robot kinematics when the probe tip is at different positions on different surfaces of the tool reference structure 34. The position of the probe tip is then determined in the robot base coordinate system by best fit to a geometric model of the reference structure 34.

Knowing the probe tip 31 position in the robot base coordinate system rb from the measurements shown in FIG. 6a, the tool coordinate system rt2 can be calibrated in relation to the tool holder coordinate system, as shown in FIG. 6b. Here, the reference tool 32, which has a known geometry, is replaced with the real tool, which has an unknown geometry. A second tool reference structure 36 is mounted on the tool, or on the tool holder 11. A second reference tool coordinate system Ort2, Xrt2, Yrt2, Zrt2 is defined in fixed relation to the reference structure 36. The robot is once more used to measure the positions and orientations of the tool coordinate system, rt2, when the probe tip 31 hits the surfaces of the reference structure 36 at different positions. If the reference structure 36 has about the same position and orientation in relation to the tool holder coordinate system rth, as the reference structure 34, only small differential kinematic errors will be present in the robot tool coordinate system calculations. The second reference tool coordinate system rt2 is then determined in relation to the robot base system by best fit between the measurements and a mathematical model of the reference structure 36.

Figure 7A:
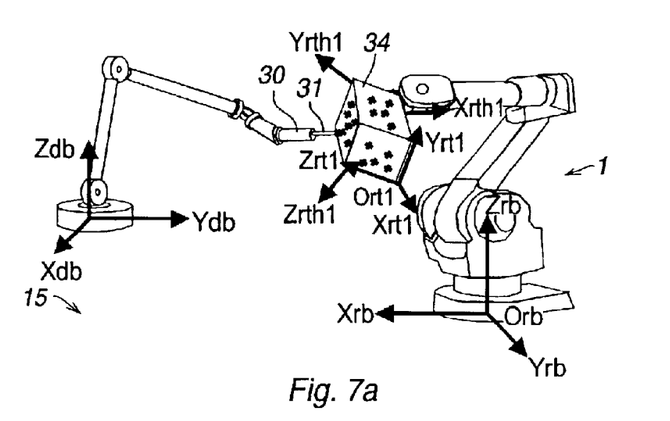
FIGS. 7a–b show determining the relation between the tool coordinate system and the robot base coordinate system, according to a second embodiment of the invention.
Figure 7B:
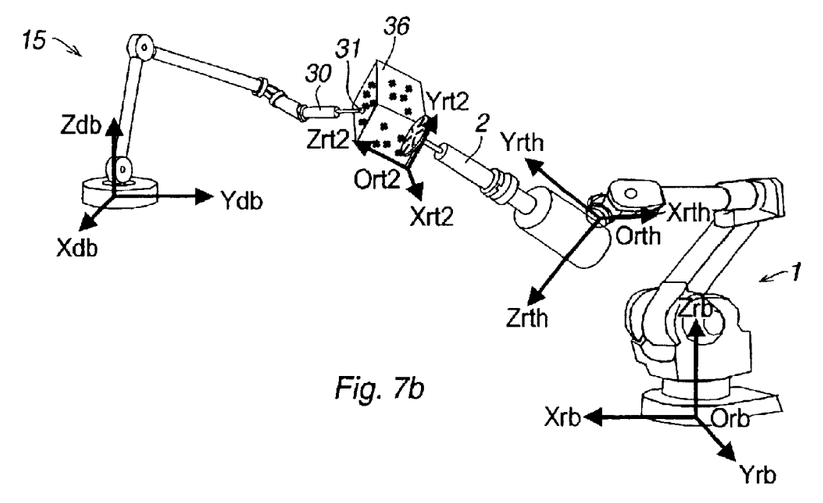
Figure 8A:
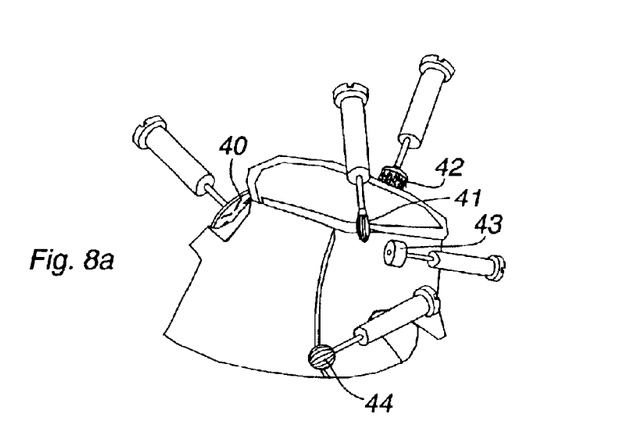
FIGS. 8a–f show several tools used in one application.
Figures 8B, 8C, 8D, 8E, 8F:
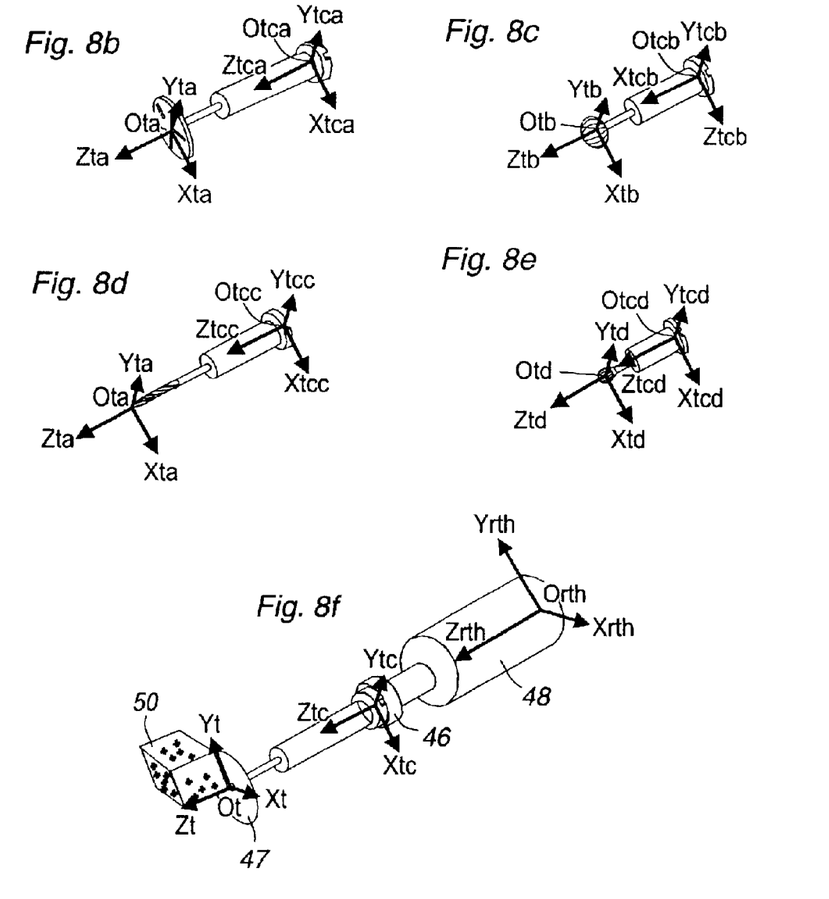

One problem with the method for determining the relation between the tool coordinate system and the robot base coordinate system as shown in FIGS. 6a and 6b, is that it is necessary to make a program for the robot to position the reference structures correct in relation to the fixed probe 30. This means some time-consuming programming, which can be avoided if the probe 30 instead is mounted on the digitizer 15, as shown in FIGS. 7a, 7b. In this case, the robot does not need to be move at all, instead the operator moves the probe 30 with the digitizer 15 to hit the surfaces of the reference structures. In this embodiment, a first tool reference structure 34 is selected on or in a fixed relation to the tool holder coordinate system rth, and a second tool reference structure 36 is selected on or in a fixed relation to the robot tool coordinate system, rt2.

The operator moves the probe 20, by means of the digitizer, to measure the surfaces of the first tool reference structure 34 and then the operator moves the probe 20 to measure the surfaces of the second tool reference structure 36 on the real tool 2. The position of the digitizer is not allowed to be changed between the measurements. The reference tool coordinate system rt1 is determined relative to the digitizer base coordinate system db by best fit between the measurements on the reference structure 34, and a mathematical model of the reference structure 34. The robot tool coordinate system rt2 is determined relative to the digitizer base coordinate system db by best fit between the measurements on the reference structure 36 and a mathematical model of the reference structure 36. Now, the relation between the reference tool coordinate system rt1 and the robot tool coordinate system rt2 is calculated. The reference tool coordinate system rt1 is known relative to the robot tool holder coordinate system rth, which is known relative to the robot base coordinate system rb. Thus, it is possible to calculate the robot tool coordinate system rt2 relative to the tool holder coordinate system rth and through the robot kinematics the robot base coordinate system rb.

Moreover, since the digitizer is usually more accurate than the robot, the reference tool must not be designed to hold the reference structure 34 close to the position of the reference structure 36 on the real tool. This means, that it is sometimes also possible to have the reference structure 34 mounted on the robot simultaneously with the real tool 2, which then does not need to be dismounted for the calibration. Thus, the first tool reference structure 34 could either be mounted on the reference tool or on the robot, preferably on the tool holder of the robot.

As for the object coordinate system calibration, different reference structures can be used and if the robot tool mounting flange has geometries that can be used for the measurements, a special reference structure is not needed. As in the same way, if the tool in itself has geometries that can be used, the reference structures in FIGS. 6b and 7b are not needed.

In cases when the tool is used to saw, mill, or grind planes, it is enough to calibrate three degrees of freedom of the tool coordinate system, since the lateral position of the tool on the plane is not important for the processing result. The only requirements for high accuracy are the distance between the tool and the plane and the two tilt angles of tool relative the plane. Therefore, the tool coordinate system can be calibrated only with a plane as a reference structure, preferable in parallel with the processing plane. Such a plane can be the surface of a sawblade or the surface of a sheet of metal mounted on a milling head.

As shown in FIGS. 8a–8e, usually, several tools are used in an application, and then it is possible to calibrate each tool by using reference structures in the tool geometry or by attaching reference structures on the tools, and adopting either of the methods described in FIGS. 6a, 6b, and 7a, 7b. However, there is often a tool exchanger between the tool and a spindle actuator and then it is usually enough to calibrate the spindle actuator with a reference tool as in FIG. 8f, in the same way as shown in FIGS. 6a, 6b and 7a, 7b. FIG. 8f shows a tool exchanger 46 provided between a reference tool 47 and a spindle actuator 48. A coordinate system, Ot, Xt, Yt, Zt is defined for the reference tool 47 and coordinate system, Otc, Xtc, Ytc, Ztc is defined for the tool exchanger 46. The relation between the reference tool coordinate system t and the tool exchanger coordinate system tc is known. The reference tool 47 is a dummy tool that is used only for calibration purposes. The reference tool 47 comprises a tool reference structure 50. The geometry of the reference tool 46 is known. It is then possible to calculate the coordinate system of the tool exchanger tc. Knowing the coordinate system of the tool exchanger and the geometry of the tools used in the application, for example, the tools shown in FIGS. 8b–8e, the tool coordinate system ta, tb, tc, td for the tools can be calculated in the tool holder coordinate system tc.

Figure 9:
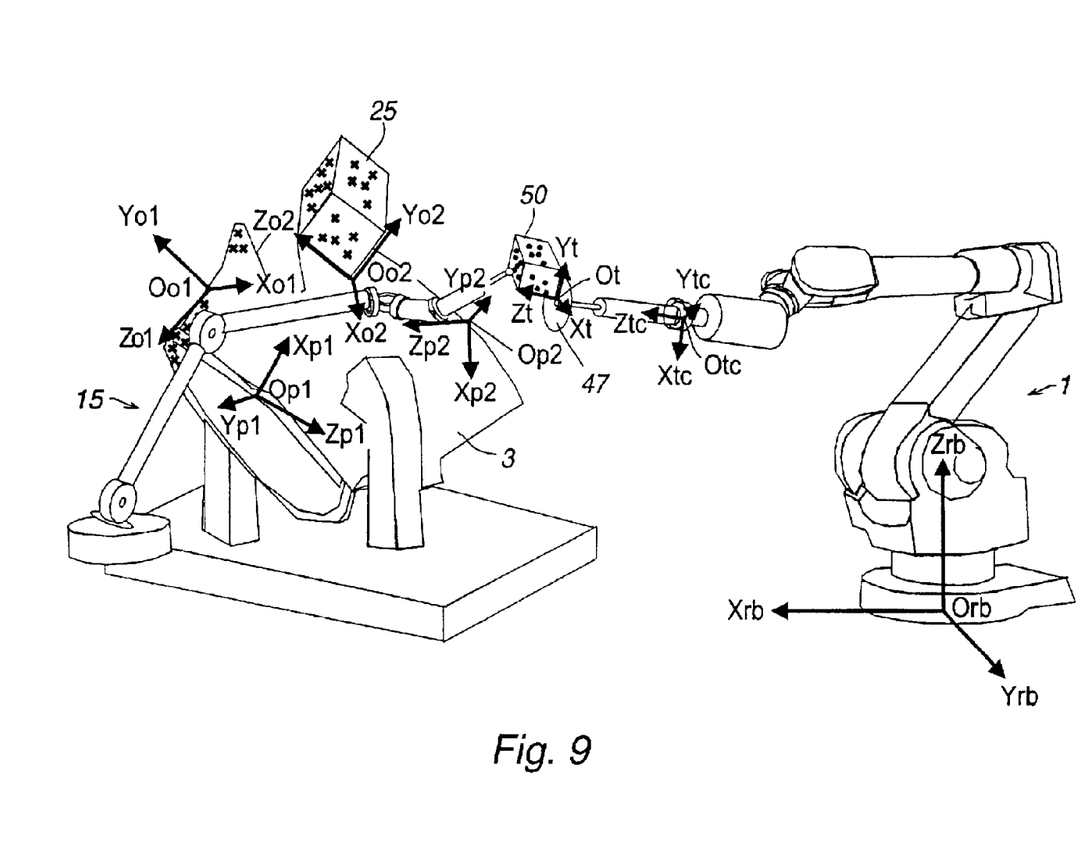
FIG. 9 shows the defining of local object coordinate systems by means of a reference structure hold by the robot.

If more than one local object coordinate system are to be defined, it is possible to use one reference structure hold by the robot to define all of the object coordinate systems, instead of having a plurality of different object reference structures on the work piece. As shown in FIG. 9, the tool reference structure 50 on the reference tool 47 can also be used to define local object coordinate systems. Alternatively, the reference structure 50 could be positioned on a real tool. The reference tool 47 is mounted on the robot. The position and orientation of the reference structure 50 is known, or calibrated, relative to the tool holder coordinate system and by means of the robot kinematics to the robot base coordinate system rb.

At first, the digitizer 15 is used to define a fixed object coordinate system o2 on the work object, by means of the object reference structure 25 attached to the work object 3. Then, the robot 1 moves the tool reference structure 50 as close as possible to the path programmed by the digitizer. The orientation of the reference tool 47 should preferably be as close as possible to the desired tool orientation for the path. Finally the digitizer measures points on the surfaces of the tool reference structure 50, to define a local object coordinate system, which in the figure is the same as the tool coordinate system, Ot, Xt, Yt, Zt. The digitizer can now refer the local object coordinate system t to the fixed object coordinate system o2, attached to the work object. Since the digitizer calculates the path positions p1, p2 in the fixed object coordinate system o2, it can now calculate the path positions also in the local object coordinate system t, defined by the reference structure 50 on the robot tool. Since the robot from the tool calibration already knows the tool coordinate systems of the tool, the path positions expressed in the local object coordinate system on the tool can be directly used for programming the robot.

The local object coordinate system t is determined relative to the digitizer base coordinate db system by best fit between the measurements and a mathematical model of the tool reference structure 50. From earlier measurements, the path position p2 is known relative to the object coordinate system o2 and relative to the digitizer coordinate system db. Thereby, it is possible to calculate the relation between the fixed object coordinate system o2 and the local object coordinate system t. Thereafter the pose p2 is calculated relative to the local coordinate system t.

The drawback with a method using a tool reference structure as the local coordinate system is that it will be more difficult to move a program from one robot to another with this method, since the digitizer must be used for re-calibrating the local coordinate systems. When the reference structure for the local coordinate systems are mounted on the work object, the robot can use stored reference structure calibration programs to automatically move the probe to touch the surfaces of the reference structures. On the other hand, using a reference structure on the tool as a local object coordinate system means that actually no reference structure at all is needed on the object. Thus, in applications with small lot size production, it will be favorable to use just a tool reference structure for the definition of object coordinate systems. When these tool-based object coordinate systems are defined, it is important to have the tool in an orientation as close as possible to the orientation used in the path positions. Moreover, no robot axis should change torque direction when moving from the reference structure calibration positions to the path positions. This is especially important for the main axis of the robot.

Up to now, calibration methods when the robot carries the tool have been presented. If the robot carries the work object instead and the tool is fixed to the robot cell or another manipulator, then the method is performed according to any of the methods shown in FIGS. 10a–10b and 11.

Figure 10A:
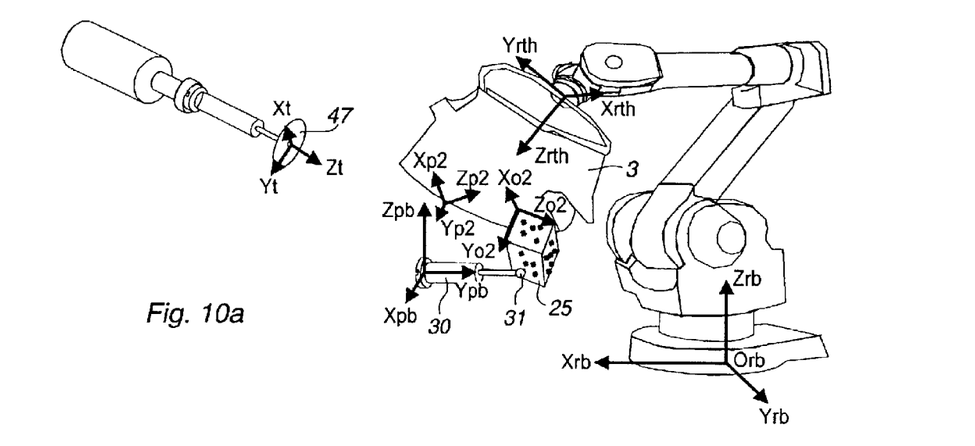
FIGS. 10a–b shows work object calibration by means of a fixed positioned measuring probe, when the work object is mounted on the robot and the tool is at a fixed position.

FIG. 10a shows the calibration of the object coordinate system o2 relative to the robot base coordinate system rb, when a measuring-probe 30 fixed to the robot cell is used. At first the coordinate system rt1 or position of the fixed probe 30 is calculated in relation to the robot base coordinate system rb, in the same way as was earlier shown in FIG. 6a. For this purpose a reference tool 32 having a reference structure 34, with known geometry, is attached to the robot tool holder, as shown in FIG. 6a. The relation between the coordinate system rt1 of the reference structure 34 and the robot tool holder coordinate system rth is known. Therefore, the probe coordinate system rt1 can be calculated in relation to the robot base coordinate system rb.

Then the work object 3 with its object reference structure 25 is mounted on the robot tool holder coordinate system rth. The robot is moved towards the probe 30, so that different surfaces of the reference structure 25 hit the tip 31 of the probe. The object coordinate system o2 is determined relative to robot base coordinate system rb by best fit between the measurements and the model of the reference structure 25. Compare the tool calibration shown in FIG. 6b. In this embodiment the tool 47 is fixed positioned relative to the robot cell. Thus, beside the calibration of the object coordinate system o2, also the tool coordinate system t must be calibrated. The calibration of the fixed mounted tool 47 can be compared with the object coordinate system calibrations when the robot carries the tool as shown in FIG. 4b.

Figure 10B:
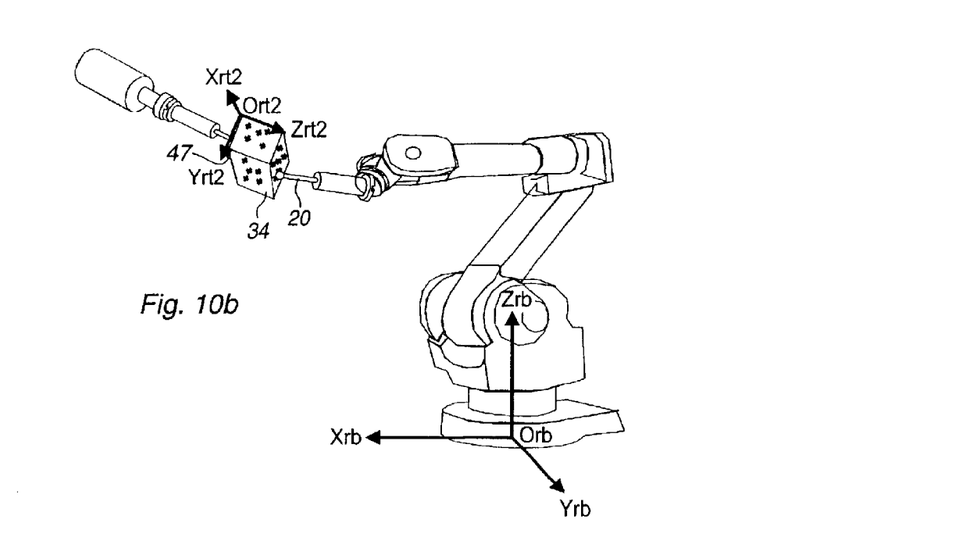

FIG. 10b shows the calibration of the tool coordinate system having a fixed tool 47. A probe 20, with known geometry, is mounted on the robot and a reference structure 34, with known geometry, is mounted on or in fixed relation to the tool 47. The position of the coordinate system rt2 of the reference structure 34 is known in relation to the robot tool coordinate system t. The probe 20 is used for measurements on the surfaces of the tool reference structure 34. Now, the robot knows the tool coordinate system t in relation to the object coordinate system o2, and if the digitizer is used to program the path positions in relations to the object coordinate system, the robot can run a program with these relative positions from the digitizer.

Figure 11:
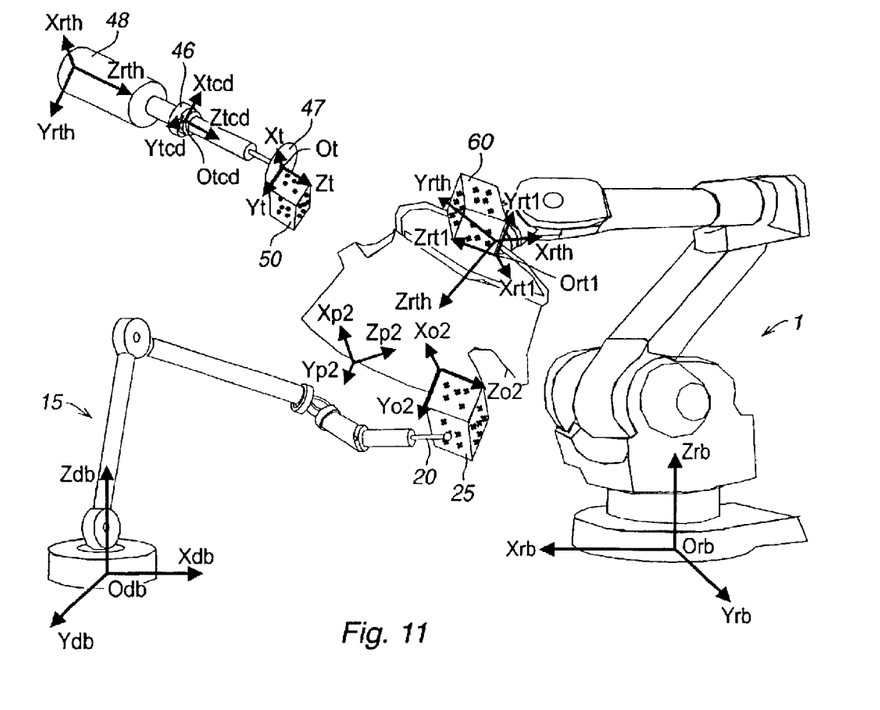
FIG. 11 shows work object calibration by means of a digitizer, when the work object is mounted on the robot and the tool is at a fixed position.

In the same way as shown in FIG. 7 for the calibration of the tool coordinate system when the tool is mounted on the robot, the digitizer 15 can be used to calibrate the object coordinate system o2 when the work object 3 is mounted on the robot as shown in FIG. 11. Because of the easy access with the probe 20 on the digitizer, it is possible to measure both a reference structure 60 on the robot 1 and a reference structure 47 on the work object 3 in the same stage, without dismounting the work object. Moreover, the digitizer can also be used to measure the tool coordinate system, giving the robot controller a fixed tool coordinate system in relation to the tool holder coordinate system. It should be mentioned that the digitizer can be mounted on the work object or the gripper or the tool holder to decrease the requirements on the work space of the digitizer.

With reference to FIG. 11 it will now be described how the path position p2 is determined relative to the tool coordinate system t, by using the digitizer. The robot reference structure 60 is mounted on the robot in a known relation to the robot tool holder coordinate system rth, which is known I relation to the robot base coordinate system rb because of the robot kinematics. Thus, the coordinate system rt1 of the reference tool 60 is known in relation to robot base coordinate system rb. The digitizer measures positions on the surface of the robot reference structure 60. The relation between the reference tool coordinate system rt1 and the digitizer coordinate system db is determined by best fit between the measurements and a model of the reference structure 60.

To determine the object coordinate system o2 in relation to the digitizer base coordinate system db, measurements are made on the surface of the object reference structure 25 by the digitizer. The object coordinate system o2 is determined in relation to the digitizer base coordinate system db, by best fit between the measurements and a model of the object reference structure 25. The path is then programmed by means of the digitizer 15 and thus the path positions p2 are obtained in relation to object coordinate system o2. The tool coordinate system t is determined in relation to the digitizer base coordinate system by best fit between measurements made by the digitizer on the surface of the tool reference structure 50 and a model of the reference structure 50. The tool coordinate system t is calculated relative to the reference tool coordinate system rt1, and since the reference tool coordinate system rt1 is known relative to the tool holder coordinate system rth, it is possible to calculate the tool coordinate system t relative to the robot base coordinate system rb.

Thereafter the relation between the object coordinate system o2 and the reference tool coordinate system rt1 is calculated, and since reference tool coordinate system rt1 is known relative to the robot tool holder coordinate system rth it is possible to calculate the object coordinate system o2 in the robot base coordinate system rb. During programming the path positions p2 is measured relative to the object coordinate system o2 and thereby the path positions can be calculated in the robot base coordinate system. As the tool coordinate system t and the path positions p2 are known in the robot base coordinate system rb, the path positions p2 can be calculated in the tool coordinate system t.

In the fixed tool case, the relation between the object coordinate system o2 and the tool holder coordinate system rth will always be the same and independent of the configuration of the robot. However, in a given position in one path, the robot configuration may differ a lot from that in a position in another path. Therefore, the tool coordinate system or the object coordinate system must sometimes be updated to form local coordinate systems that must be used in the robot program for parts of the paths in the same way as the object coordinate system must be updated in the case when the robot carried the tool. The calibration of these local coordinate systems are made simply by moving the robot to get the fixed tool close to the path and make a recalibration of the object coordinate system, or the tool holder coordinate system, with the digitizer. In the case with the use of a fixed probe as in FIGS. 10a–b, the local object coordinate systems are calibrated by use of local object reference structures, which are moved against the fixed probe by the robot.

The present invention is not limited to the embodiments disclosed but may be varied and modified within the scope of the following claims. For example it is possible to use only one reference structure for programming more than one path on the work object. It is also possible to use more than one local object coordinate system for programming one single path. Different local object coordinate systems are then used for programming different poses on the path.

In the embodiments described herein, the measurements of the reference structure comprise measuring at least three positions on the surface of the reference structure. Alternatively, the measurements may comprise measuring at least one position on the surface of the reference structure and measuring the normal direction to the surface.

What is claimed is:

1. A method for programming of an industrial robot having a robot coordinate system, for an application comprising a tool having a tool coordinate system and a work object to be processed by the tool, wherein the application is programmed by means of a position-measuring unit adapted for measuring positions relative a measuring coordinate system, wherein the method comprises:

selecting an object reference structure on or in a fixed relation to the object, the object reference structure having at least one surface, defining a mathematical model for the object reference structure, defining an object coordinate system in a fixed relation to the object reference structure, providing measurements on said at least one surface of the object reference structure, the measurements being performed by the position-measuring unit and are provided relative to the measuring coordinate system, determining the object coordinate system in relation to the measuring coordinate system, by means of best fit between said measurements performed by the position-measuring unit and said mathematical model of the object reference structure, measuring a plurality of positions on a desired robot path on the object by means of the position-measuring unit, determining the positions of the robot path in the object coordinate system, based on said measured positions of the robot path and said determined object coordinate system, determining the relation between the object coordinate system and the robot coordinate system, determining the relation between the tool coordinate system and the robot coordinate system, and programming the robot path based on said positions of the robot path in the object coordinate system, said relation between the object coordinate system and the robot coordinate system, and said relation between the tool coordinate system and the robot coordinate system.

2. A method according to claim 1, wherein said object reference structure is three-dimensional and has at least three non-parallel surfaces and measurements are provided on said at least three surfaces of the object reference structure.

3. A method according to claim 1, wherein said object reference structure is any of a cube, a cone or a cylinder.

4. A method according to claim 1, wherein said selected object reference structure is positioned in the vicinity of said robot path.

5. A method according to claim 1, wherein the robot comprises a base and said robot coordinate system is attached to the base of the robot.

6. A method according to claim 1, wherein the relation between the object coordinate system and the robot coordinate system comprises performing measurements on at least one surface of the object reference structure, or of a reference structure on or in a fixed relation to the robot, wherein the measurements are performed by means of an elongated probe and the inclination of the probe relative to the surface during the measurements are essentially the same as the inclination of the tool in relation to the object in the robot path.

7. A method according claim 1, wherein the determining of the relation between the object coordinate system and the robot coordinate system comprises:

performing measurements on said surface of the object reference structure, the measurements being performed by the robot and are provided relative to the robot coordinate system, and determining the object coordinate system in relation to the robot coordinate system, by means of best fit between said measurements performed by the robot and said mathematical model of the object reference structure.

8. A method according to claim 7, wherein a robot program, for performing said measurements on the object reference structure by the robot, is automatically generated based on said measurements on the object reference structure performed by the position-measuring unit.

9. A method according to claim 7, wherein the direction of the normal of said surface of the object reference structure is calculated, based on said measurements on the object reference structure performed by the position-measuring unit, and the robot is moved along said calculated direction towards the surface when performing said measurements.

10. A method according to claim 1, wherein the determining of the relation between the object coordinate system and the robot coordinate system comprises:

selecting a robot reference structure on or in a fixed relation to the robot, the robot reference structure having at least one surface, defining a mathematical model for the robot reference structure, defining a second robot coordinate system in a fixed relation to the robot reference structure, performing measurements on said at least one surface of the robot reference structure, determining the object coordinate system in relation to said first mentioned robot coordinate system, by means of best fit between said measurements of the robot reference structure and said mathematical model of the robot reference structure.

11. A method according to claim 10, wherein it comprises:

providing a measuring probe in a fixed known position relative to the robot, performing measurements on the surface of the robot reference structure, the measurements being made by said measuring probe, performing measurements on the surface of the object reference structure, the measurements being made by said measuring probe, determining the relation between the object coordinate system and the second robot coordinate system, based on said measurements of the robot reference structure and said measurements of the object reference structure made by said measuring probe.

12. A method according to claim 10, wherein said measurements on said surface of the robot reference structure are made by the position-measuring unit and relative to the measuring coordinate system, and said relation between the object coordinate system and the robot coordinate system are determined, based on said object coordinate system relative to the measuring coordinate system.

13. A method according to claim 10, wherein the robot comprises a tool holder and said robot reference structure is selected on or in a close vicinity of the tool holder of the robot.

14. A method according to claim 10, wherein the robot is provided with a tool having an inner end connected to the robot and an outer end, and said robot reference structure is positioned on or in a close vicinity of the outer end of the tool.

15. A method according to claim 1, wherein the method further comprises:

selecting a second object reference structure on or in a fixed relation to the object, the second object reference structure having at least one surface, defining a second object coordinate system on or in a fixed relation to the object reference structure, providing measurements on said at least one surface of the second object reference structure, the measurements being performed by the position-measuring unit and are provided relative to the measuring coordinate system, and determining the second object coordinate system in relation to the measuring coordinate system, by means of best fit between said measurements on the second object reference structure and said mathematical model of the object reference structure, determining the relation between the second object coordinate system and the robot coordinate system, the robot path positions are determined and programmed based on either the first or the second coordinate system according to a chosen condition.

16. A method according to claim 15, wherein a robot path position is determined and programmed based on which of the first and second coordinate systems is closest to the robot path position.

17. A method according to claim 15, wherein a robot path position is determined and programmed based on which of the first and second coordinate systems has about the same orientation, as the desired tool orientation in the robot path position.

18. A method according to claim 15, wherein a robot path position is determined and programmed based on which of the first and second coordinate systems has about the same torque direction on the robot axis, as the path position.

19. A method according to claim 1, wherein said object reference structure is at least a plane.

20. A method according to claim 1, wherein the tool comprises a tool base for attaching the tool to the robot, and determining the relation between the tool coordinate system and the robot coordinate system comprises:

defining an reference coordinate system on or in a fixed relation to the tool base, the relation between the reference tool coordinate system and the robot coordinate system being known, selecting a first tool reference structure on or in a fixed relation to the reference coordinate system, the first tool reference structure having at least one surface, defining a mathematical model for the first tool reference structure, selecting a second tool reference structure in a fixed relation to the tool coordinate system, and at a distance from the first tool reference structure, the second tool reference structure having at least one surface, defining a mathematical model for the second tool reference structure, providing measurements on said at least one surface of the first tool reference structure, providing measurements on said at least one surface of the second tool reference structure, determining the relation between the tool coordinate system and the reference coordinate system, by means of best fit between said measurements on the first and the second tool reference structures, and said mathematical models of the object reference structures.

21. A computer program product for programming of an industrial robot having a robot coordinate system for an application comprising a tool having a tool coordinate system and a work object to be processed by the tool, wherein the application is programmed by means of a position-measuring unit adapted for measuring positions relative a measuring coordinate system, and the computer program product comprises program instructions which, when loaded into a computer, causes the computer to perform:

receiving measurements from at least one surface of an object reference structure on or in a fixed relation to the object, the measurements being provided relative to the measuring coordinate system, determining an object coordinate system, defined in a fixed relation to the object reference structure in relation to the measuring coordinate system, by means of best fit between said measurements performed by the position-measuring unit and a mathematical model of the object reference structure, receiving a plurality of positions on a desired robot path, determining the positions of the robot path in the object coordinate system, based on said measured positions of the robot path and said determined object coordinate system, determining the relation between the object coordinate system and the robot coordinate system, determining the relation between the tool coordinate system and the robot coordinate system, and programming the robot path based on said positions of the robot path in the object coordinate system, said relation between the object coordinate system and the robot coordinate system, and said relation between the tool coordinate system and the robot coordinate system.

22. A computer readable medium having a program recorded thereon, where the program is to make a computer perform the steps of claim 21, when said program is run on the computer.

* * * * *